Patented Sept. 10, 1946

2,407,419

UNITED STATES PATENT OFFICE 2,407,419

STABILIZATION OF TETRAFLUORO-ETHYLENE

William Edward Hanford, Easton, Pa., assignor to E. I. du Pont de Nemours & Company, Wilmington, Del., a corporation of Delaware No Drawing. Application February 15, 1943, Serial No. 476,025

10 Claims. (Cl. 260—652.5)

This invention relates to new compositions of matter and more particularly to compositions comprising fluoroethylenes which are stabilized against spontaneous polymerization.

Tetrafluoroethylene polymerizes after standing a few days at room temperature under superatmospheric pressure in accordance with the teaching of U. S. Patent 2,230,654. This spontaneous polymerization of tetrafluoroethylene is acutely undesirable since it necessitates costly and time-consuming precautions for the safe storing of tetrafluoroethylene. Thus prior to the present invention it has been an accepted practice to store tetrafluoroethylene at the temperature of solid carbon dioxide since only in this way could polymerization be prevented and tetrafluoroethylene stored in an appreciable quantity over a period of time.

This invention has as an object the production of stabilized fluoroethylenes which can be stored at normal temperature and superatmospheric pressure for an indefinite period of time without undergoing spontaneous polymerization. Other objects will appear hereinafter.

I have discovered that this polymerization of fluoroethylene compounds can be prevented by incorporating therewith a small proportion of a compound containing amine nitrogen and that the stabilized product thus obtained can be stored at normal temperature and superatmospheric pressure for an indefinite period of time without undergoing polymerization. For example, tetrafluoroethylene to which is added about 0.1% to 1% by weight of tributylamine undergoes no spontaneous polymerization whatever on storage under its own vapor pressure at 25° C., whereas unstabilized tetrafluoroethylene undergoes appreciable polymerization in a few days under such conditions.

The invention is further illustrated by the following examples:

*Example I*

A thick walled glass tube is filled about half full of liquid tetrafluoroethylene by condensing the tetrafluoroethylene while the tube is immersed in a bath of liquid ethylene. The free space in the tube is then filled with ammonia gas, the tube is placed in liquid nitrogen to freeze the tetrafluoroethylene and it is sealed. The tube is then allowed to stand at room temperature, under which conditions the liquid tetrafluoroethylene is under its own vapor pressure. After one week but a trace of polymer has formed in the glass tube. The tube is allowed to stand for a total of 6.5 months, during which time essentially no more polymerization takes place.

In a control experiment carried out under similar conditions without the addition of ammonia, the tetrafluoroethylene is completely polymerized in less than one week.

*Example II*

To a glass tube similar to that employed in Example I is added about 0.1 part of p-phenetidine, and the tube is then immersed in a bath of liquid ethylene and filled about half full of tetrafluoroethylene (about 20 parts) by condensation. The tube is then transferred to a bath of liquid nitrogen, and after freezing, it is sealed. The tube is then allowed to stand at room temperature, under which conditions the tetrafluoroethylene is a liquid under its own vapor pressure. After standing for 12 days there is formed only a trace of polymer, corresponding to less than 1% of the total tetrafluoroethylene present.

Under similar conditions a control experiment containing no stabilizer is completely polymerized in less than one week.

*Example III*

Example II is repeated employing di-n-butylamine instead of p-phenetidine as stabilizer. A very small amount of polymer is formed in the first week of standing at room temperature, and thereafter no further polymerization occurs for six months. The total quantity of polymer formed corresponds to less than 1% by weight of the total tetrafluoroethylene present.

*Example IV*

Example II is repeated employing tri-n-butylamine in place of p-phenetidine as stabilizer. No polymerization whatever occurs under these conditions after the tube has stood at room temperature for 6.25 months.

*Example V*

Tetrafluoroethylene stored in the absence of its liquid phase under 200 lbs./sq. in. pressure at room temperature in a steel container undergoes some spontaneous polymerization after standing for about a month. However, the addition of 0.5% by weight of tributylamine to the storage container effectively and completely prevents this polymerization over a period of more than six months.

The fluoroethylene compounds referred to herein are halogenated ethylene compounds containing at least one fluorine atom. Examples of these compounds are vinyl fluoride, 1,1-difluoroethylene, 1-fluoro-1-bromoethylene, 1-fluoro-2-chloroethylene, 1,2-difluoro-1,2-dichloroethylene, 1,1-difluoro - 2,2-dichloroethylene, 1,1,2-trifluoro-2-chloroethylene and tetrafluoroethylene. The process of this invention is particularly suitable for the stabilization of polyfluoroethylenes, i. e., those containing more than one fluorine atom.

The amino compounds, in addition to those disclosed in the examples, which can be used as the polymerization stabilizers include a large number of available compounds, examples of which are primary aliphatic amines, such as ethylamine and butylamine; secondary aliphatic amines, such as dihexylamine and methylbutylamine; tertiary aliphatic amines, such as trimethylamine and triethylamine; primary aromatic amines, such as beta-naphthylamine and aniline; secondary aromatic amines, such as diphenylamine and phenyl alpha-naphthylamine; tertiary aromatic amines, such as triphenylamine; mixed secondary amines, such as N-monomethyl aniline and N-propyl aniline; and mixed tertiary amines, such as N-dimethyl aniline and N-butyl diphenylamine. The stabilizers of this invention may be further characterized in that they are basic compounds containing amino nitrogen, i. e., they include ammonia and substituted ammonias in which one or more of the hydrogen atoms is replaced by alkyl, alkaryl, aralkyl, or aryl hydrocarbon radicals.

The stabilizer is to be employed in amounts ranging from about 0.001% to about 5%, based on the monomer. In general, however, it is preferred to employ the stabilizers in amounts ranging from about 0.01% to about 1%, based on the amount of monomer.

Fluoroethylene compounds which are stabilized according to the method given in this invention can be stored indefinitely without danger of polymerization. On the contrary, the unstabilized compound polymerizes on standing, either completely filling the container with solid polymer or filling the exit valves, so that the removal of the remainder of the unpolymerized material is impossible. Since such circumstances are not only undesirable but also dangerous, it is of great advantage to be able to store fluoroethylenes indefinitely without danger of such polymerization and by means of stabilizers which are readily removed from the monomer. It is not essential that the stabilizers of this invention be removed prior to catalytic polymerization of the fluoroethylene. However, if desired this removal can be accomplished, for example, by fractional distillation, by scrubbing with an acid solution or by passing the gas over an absorbent for the stabilizer.

As many apparently widely different embodiments of this invention may be made without departing from the spirit and scope thereof, it is to be understood that I do not limit myself to the specific embodiments thereof except as defined in the appended claims.

I claim:

1. A process for treating tetrafluoroethylene which substantially reduces its tendency to spontaneous polymerization at normal temperature and superatmospheric pressure, said process comprising mixing with said tetrafluoroethylene a small amount of tertiary hydrocarbon amine.

2. A process for treating tetrafluoroethylene which substantially reduces its tendency to spontaneous polymerization at normal temperature and superatmospheric pressure, said process comprising mixing with the tetrafluoroethylene a small amount of a tertiary aliphatic hydrocarbon amine.

3. A process for treating tetrafluoroethylene which substantially reduces its tendency to spontaneous polymerization at normal temperature and superatmospheric pressure, said process comprising mixing with said tetrafluoroethylene a small amount of tributyl amine.

4. Tetrafluoroethylene stabilized with sufficient tertiary hydrocarbon amine to prevent polymerization of the tetrafluoroethylene at 25° C. and superatmospheric pressure.

5. Tetrafluoroethylene stabilized with sufficient tertiary aliphatic hydrocarbon amine to prevent polymerization of the tetrafluoroethylene at 25° C. and superatmospheric pressure.

6. Tetrafluoroethylene stabilized with sufficient tributylamine to prevent polymerization of the tetrafluoroethylene at 25° C. and superatmospheric pressure.

7. The process set forth in claim 1 in which said tertiary hydrocarbon amine is added in amount of from 0.001% to 5% by weight of the tetrafluoroethylene.

8. Tetrafluoroethylene stabilized with tertiary hydrocarbon amine in amount of from 0.001% to 5% by weight of the tetrafluoroethylene.

9. Tetrafluoroethylene stabilized with tertiary aliphatic hydrocarbon amine in amount of from 0.001% to 5% by weight of the tetrafluoroethylene.

10. Tetrafluoroethylene stabilized with tributylamine in amount of from 0.001% to 5% by weight of the tetrafluoroethylene.

WILLIAM EDWARD HANFORD.